United States Patent [19]

Lombardi

[11] 4,110,145
[45] Aug. 29, 1978

[54] METHOD FOR SEALING PLASTIC FILMS AND THE LIKE

[75] Inventor: Anthony Joseph Lombardi, Flanders, N.J.

[73] Assignee: Barney Knitting Machinery Co., Inc., Brooklyn, N.Y.

[21] Appl. No.: 807,012

[22] Filed: Jun. 16, 1977

Related U.S. Application Data

[62] Division of Ser. No. 698,189, Jun. 21, 1976, Pat. No. 4,045,272.

[51] Int. Cl.$^2$ .................. B29D 23/10; B29C 19/06
[52] U.S. Cl. .................................. 156/218; 156/275
[58] Field of Search .......................... 156/275, 218

[56] References Cited

U.S. PATENT DOCUMENTS

| 2,647,072 | 7/1953 | Smith | 156/275 |
| 2,773,773 | 12/1956 | Harder et al. | 156/218 |
| 3,921,847 | 11/1975 | Rentmeester | 156/218 |

*Primary Examiner*—Douglas J. Drummond

[57] ABSTRACT

There is disclosed herein an improved method and apparatus for plastic sealing/bonding in which a wire element is positioned between two interfacing (plastic) pieces to be sealed/bonded together, wherein one or both of said pieces are wholly plastic or contain a plastic component. With the wire sandwiched and retained between the interfacing surfaces, a voltage is applied to the wire for a predetermined time to cause the wire to heat sufficiently to melt both interfacing surfaces and effect a fusion and formation of a bond.

10 Claims, 12 Drawing Figures

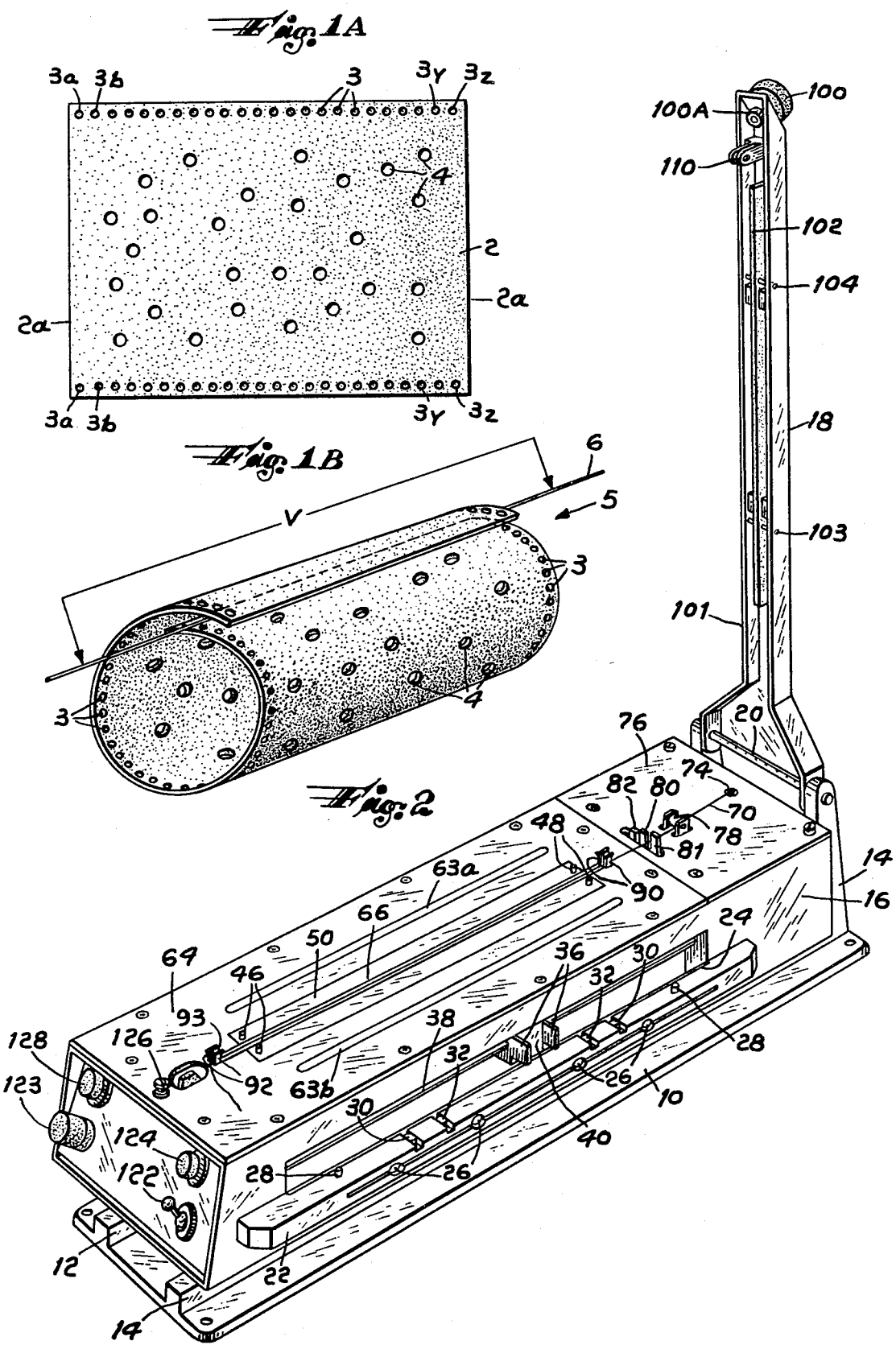

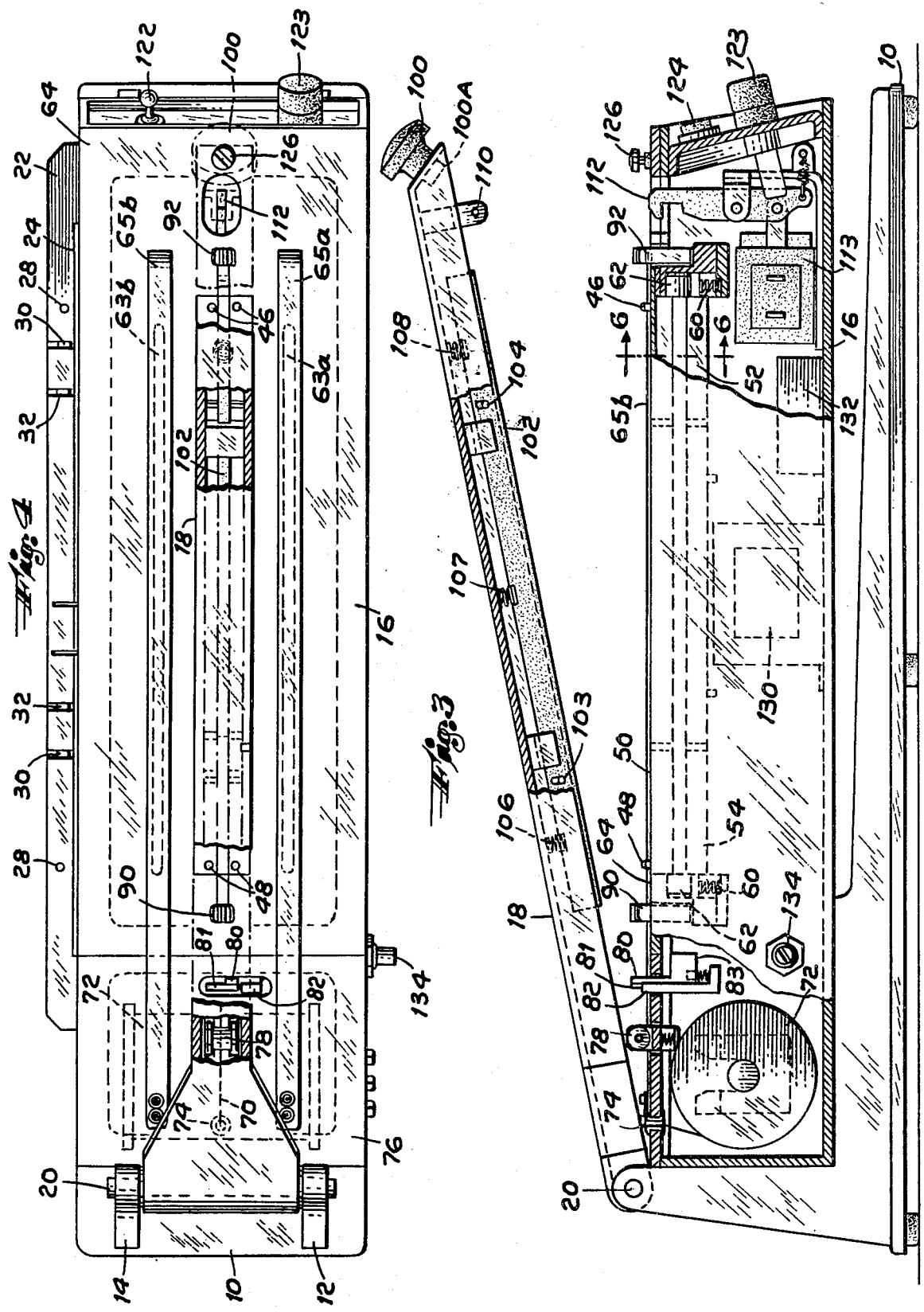

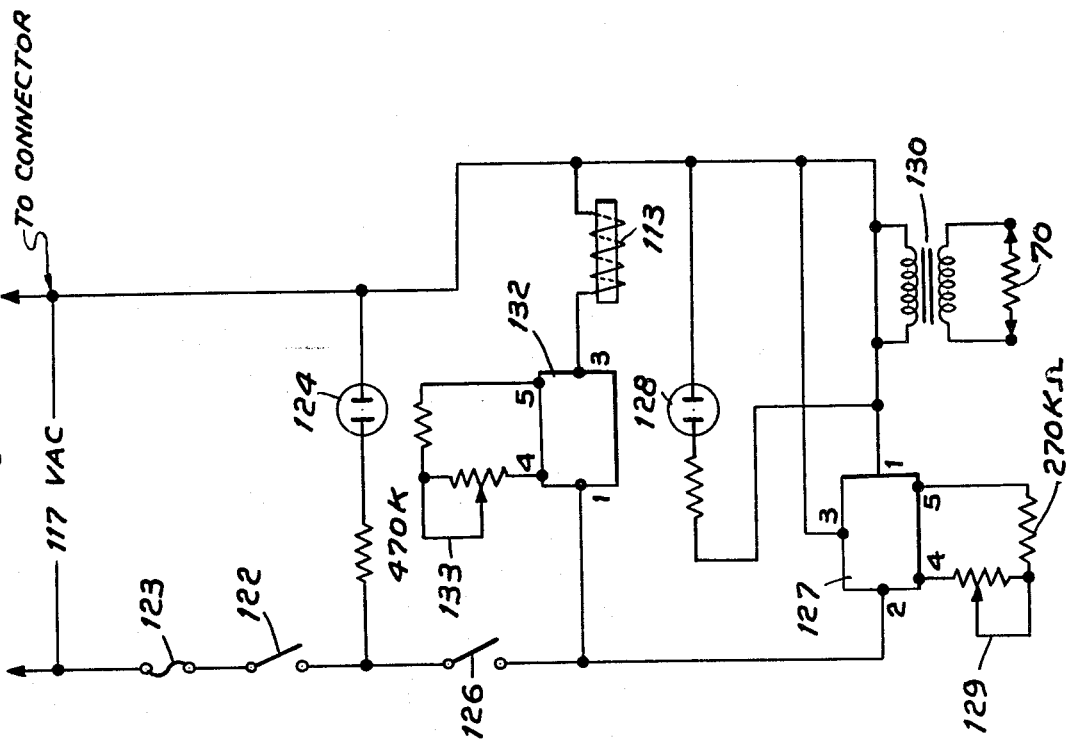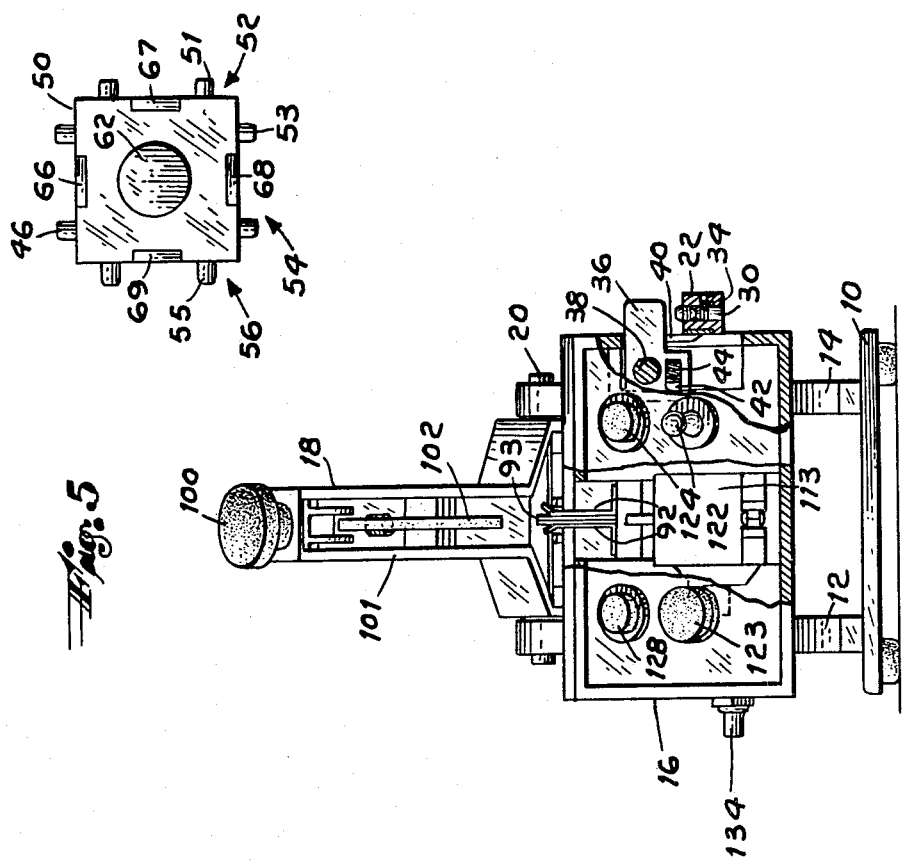

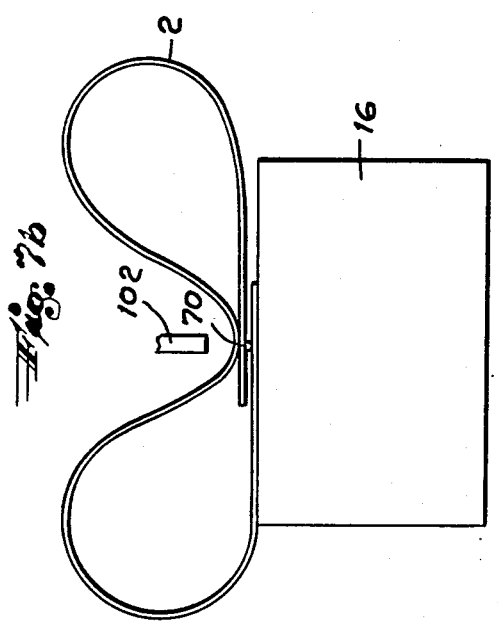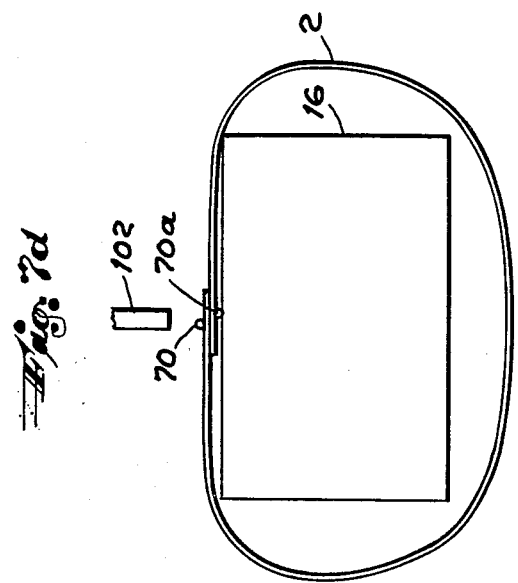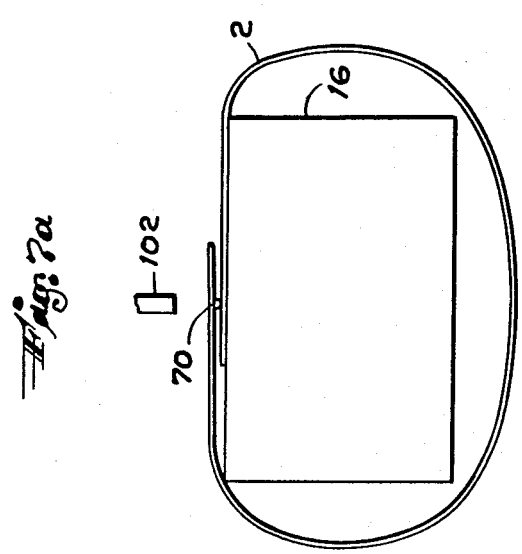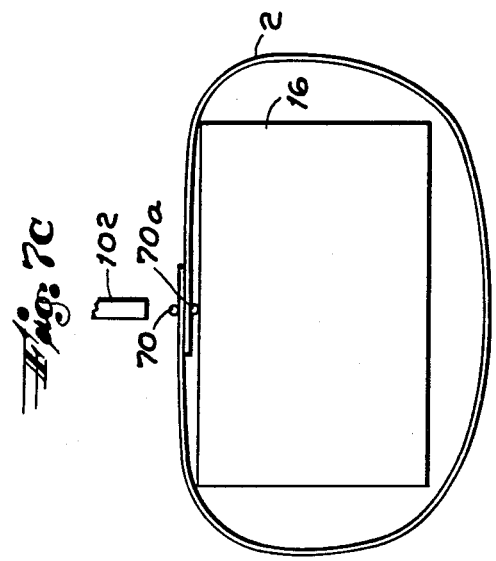

METHOD FOR SEALING PLASTIC FILMS AND THE LIKE

This is a division, of application Ser. No. 698,189 filed June 21, 1976 now U.S. Pat. No. 4,045,272.

BACKGROUND OF THE INVENTION

In general, this invention relates to a method and means for sealing or bonding plastics to themselves or to plastics of different material and thicknesses, and more particularly to an improved method and apparatus for sealing difficult to seal plastic films and the like.

Some of the better known methods of bonding various plastic films and the like are the use of adhesive/solvents, dielectric and thermal heating, and ultrasonic vibrations. The sealing or bonding of plastics by adhesives or solvents is achieved by spraying, brushing or dipping the areas to be bonded, then clamping them together until they are dried. Although the initial investment of this system of bonding is low, disadvantages are found in the time cycle that prevails from the application of the solvent or adhesive until it is fully dried. Furthermore, the effectiveness and permanency of the adhesive or solvent bond is often seriously impaired in the presence of a warm and humid atmosphere in which bonded films are frequently used and stored. Additionally, the solvents and adhesives are all somewhat toxic; therefore, care has to be taken to prevent operator inhalation and direct skin contact. This usually calls for elaborate ventilation and washroom facilities. Another disadvantage of the adhesive solvent system of bonding plastics is the inconsistent quality of the bond.

Dielectric heating is the principle employed in electronic heat sealing of plastic films and fabrics. In this method, radio frequency energy is induced into the work area by the presence of a dielectric field produced from a source of high frequency voltage of suitable magnitude for the thickness of the work load. The work piece must possess a loss characteristic that enables the dielectric field to force the work piece to rise in temperature. The loss characteristic, or power factor, has to be of sufficient magnitude to allow ample heating to occur without the need of excessive RF voltages. The molecular structure of the plastic material determines the presence and the extent of the necessary polarization, which is the root of the heating process. Rapid alternations in the polarity of the field cause the molecules that have polar movement to attempt to follow those alternations, and as a result of their rapid agitation, the friction loss creates the heating effect desired. Dielectric heat sealing has a number of disadvantages and limitations including the cost of the high frequency generators; the great accuracy that must be exercised to ensure that the press bed and heat are flat and planoparallel; and only materials requiring low potentials can be heated while others such as polyethylene cannot be heated at all.

The thermal heat bonding of plastics is achieved by the application of heat to selected areas on the outside surfaces of the plastic pieces. Time is then allowed for the interface to reach fusing temperatures. A large temperature differential can exist between the outside heated surface and the bonded surfaces. Distortion and embrittlement can result, and this is especially true with thick materials.

The ultrasonic method of bonding plastics uses a source of electrical energy having the desired frequency which is converted into a vibratory mechanical force, by using special materials having piezoelectric or magnetostrictive properties. Ultrasonic apparatus includes a power supply, a sonic converter and a horn. The power supply changes the 60 cycle line voltage to 20,000 cycles, and the sonic converter changes the 20,000 cycles of electrical energy into mechanical oscillations at the same frequency by means of a piezoelectric element made of lead zirconate titanate. Converter efficiencies range from 75 to 90 percent, and available mechanical output power ranges from 2200 to 8800 in-lbs. per second.

The horn is a half-wave resonant metal section designed to transmit mechanical vibrations at an amplitude of from 0.0005 to 0.005 inches from the sonic converter to the parts being joined. In bonding or sealing of plastic films and the like, the horn is coupled to the upper part to be joined so that the part vibrates against the lower part at ultrasonic rates (20,000 cps) to produce friction and heat at the interface of the two parts. The quality of the bond formed by this ultrasonic method depends on the pressure of the tool on the work surfaces, the length of time which the vibrations are impressed on the work, the amplitude of vibration of the horn, the percentage of change in thickness of the mating surfaces, and the type of plastics. Therefore, it can be seen that ultrasonic sealing/bonding does require strict control of various parameters in order to ensure quality sealing. Other detrimental aspects of ultrasonic sealing that require close scrutiny are the ill effects that may result from the operation of ultrasonic equipment such as hearing loss, and other physiological effects which include fatigue, nausea, pain and blood changes which are attributable to airborne noise radiated by the equipment, as well as any local damage resulting from direct contact with an ultrasonically vibrating device. Additionally, the ultrasonic apparatus is costly and requires skilled personnel for its operation and maintenance.

In order to overcome the foregoing problems and potential health hazards, an improved method and apparatus for bonding plastic films and the like is hereinafter described.

SUMMARY OF THE INVENTION

An object of the invention is to provide an improved method and apparatus for sealing/bonding (plastic) pieces and the like.

Another object of the invention is to provide an improved method and apparatus for sealing/bonding difficult to seal plastic films and the like.

A further object of the invention is to provide an improved method and apparatus for making tubular-shaped patterns from polyester films or cellulose nitrate/cloth combinations for use on a Jacquard or other type pattern card control units.

According to the broader aspects of the method and apparatus of the invention, a wire element is positioned and sandwiched between two interfacing plastic pieces, and a voltage is applied to the wire for a predetermined time causing the wire to heat and melt both sides of the interfacing plastic pieces, whereby the pieces adhere along the length of the embedded wire forming a rigid bond.

There are many features and advantages in using the hot wire method and apparatus of the invention for bonding plastics. For example, the heat is applied on the interfacing surfaces, therefore thickness of material is of little concern. This also permits plastics of different or varying thicknesses to be joined, from the very thin to the very thick. The strength of joint can be varied by choosing the correct number of wire passes at the interface or change the wire configuration, i.e., corrugated. The surfaces of the joined plastics are not distorted, but remain smooth. The method and apparatus also enable plastic filled cloth to be joined without burning the cloth, and the sealing of hard to seal materials such as cellulose nitrate/cloth combinations and polyethylene terephthalate (polyesters) is easily achieved. The wire element arrangement can be used to initiate some electrical sequence such as counting, start, stopping, etc., and the operation and maintenance can be performed by unskilled personnel.

The apparatus to utilize the invention method has an initial cost and operation that is more economical than comparable sealers. The apparatus presents no health hazard, is safe to operate, and does not require a ventilated area. The wire element can be arranged to seal or bond interfaces of different configuration, i.e., round, square, rectangular, etc., and multiple film thicknesses can be bonded or sealed. The method and apparatus produce a quality of bond that is consistently good.

BRIEF DESCRIPTION OF THE DRAWINGS

The foregoing objects and features of the invention in both its apparatus and method will best be understood if reference is made to the following Figures in conjunction with the Description of the Preferred Embodiments, in which:

FIGS. 1A and B illustrate the forming of a tubular pattern from a plastic film utilizing the concept of the invention;

FIG. 2 is an isometric illustration of the apparatus according to the invention;

FIG. 3 is a side and partial cross-sectional view of the apparatus of FIG. 2;

FIG. 4 is a top view of the apparatus shown in FIG. 3;

FIG. 5 is an end view of the apparatus shown in FIG. 3;

FIG. 6 is a sectional view taken along line 6—6 of FIG. 3;

FIGS. 7a-7d are a pictorial representation of some of the methods of positioning the material for forming the tubular patterns; and FIG. 8 is a schematic diagram of a typical circuit for use with the apparatus of the invention.

DESCRIPTION OF THE PREFERRED EMBODIMENTS

According to the invention of plastic sealing/bonding that is being presented in this disclosure, a fine wire element (round, flat or other cross-section) is placed between the two interfacing plastic parts or pieces. With the wire sandwiched between these surfaces, a voltage is applied to the wire for a predetermined duration causing the wire to heat up, thereby melting both sides of the interfaces and causing them to adhere, thus forming the bond. After the bond is formed, the embedded wire element may be trimmed flush with the ends of the joined pieces and it remains as an integral part of the joint. Also, in cases where a stronger bond is required, the wire element may be arranged in two or more parallel lines across the interface and in this arrangement, a bond is produced along every wire. It will be appreciated by those skilled in the art that the wire element can also be arranged in other configurations across the interfacing surfaces. Tests have shown that with some plastic covered cloth, such as cellulose nitrate/cloth combinations, the plastic may be too thin to give satisfactory bonds and may require multiple wire passes. The same tests made with the ultrasonic techniques of bonding proved unsatisfactory. This is probably due to the softness of the material which dampens the ultrasonic vibrations and prevents the interface from attaining the required heat for sealing.

Referring now to FIGS. 1A and B, a tubular pattern control card is shown made according to the invention. A Jacquard type knitting machine has a pattern drum on which is mounted a tubular punched card for controlling the functions of the knitting machine. The most widely used plastic films for making the pattern cards are "Mylar" (a polyester) or "Dimen Cloth" (a cellulose nitrate/ cloth) manufactured by Holliston Mills, New York City; both of these films are difficult to seal. FIG. 1A shows a section of the plastic film 2 having a plurality of driving pin holes 3 and punched pattern holes 4 which are to be sensed. After the plastic film material 2 has been punched with a series of pattern holes, a predetermined length of film is cut and the edges 2a trimmed or cut on the apparatus of the invention. The film 2 is then formed into the continuous tubular pattern card 5 according to the principle of the invention as shown in FIG. 1B. A wire 6, for example a copper/nickel (Monel) with a 0.005 mil diameter, is sandwiched between the overlapping interfaces of the film 2. With the wire 6 sandwiched between the plastic film overlapping interfaces, a voltage V is applied to the wire 6 for a predetermined time, usually in the order of seconds, causing the wire to heat up and melt both sides of the interfaces to effect the bond. Normally the excess wire extending beyond the width of the thus formed tube will be cut off flush with the edge and the wire sealed along the overlapping edge remains as part of the seal without affecting the use of the resulting tubular pattern in view of the small diameter of the wire relative to the film thickness. A thermoplastic covered wire may also be advantageously used to facilitate the bonding of the plastic interfaces.

The apparatus according to the inventive method of sealing/bonding is shown and described in connection with FIGS. 2-8. The sealing apparatus comprises a base 10, two support brackets 12, 14, a rectangular shaped tubular housing 16, and a pressure arm 18 pivotally mounted in brackets 12, 14 by pin 20.

For convenience and for trimming the edges 2a of a plastic film, the apparatus includes a cutting arrangement comprising a bar support 22 having cutting edge 24 mounted by screws 26 to one wall of housing 16. Appropriately spaced pairs of positioning pins 28, 30, 32 are located in bar 22. The pairs of pins 30, 32 are extended or retracted depending on the width of the film 2 and configuration of mating holes 3 to be engaged. The pins 30, 32 are held in retracted or extended position by spring elements 34 that engage grooves located in the body of pins 30, 32 as shown in partial detail in FIG. 5. When pin 30 is retracted, spring 34 engages the upper groove, and when pin 30 is extended, the spring 34 engages the lower groove of pin 30.

A slide 36 is slidably mounted on rod 38 with an associated cutting knife 40. With the plastic film 2 in position and the holes 3 engaging the proper positioning pins 28, the slide 36 and knife 40 are traversed along the cutting edge 24 effecting the desired trimming along edge 2a of film 2. This cutting action is performed to ensure that the relationship between the cut edge 2a and its associated holes 3 are accurately held. The knife 40 may have a cutting edge which permits cutting in either direction along the cutting edge 24. The knife 40 bears against the cutting edge 24 by the force exerted by nylon presser bar 42 and spring 44.

After the plastic film 2 is trimmed, it is ready for the bonding operation. Two end holes 3a, b on each side of film 2 are placed on the corresponding pins 46, 48 in position in bar 50. The positioning bar 50 can be rotated in 90° increments to four different sides, 52, 54, 56 as shown in the partial detail of FIG. 6. Each of the different sides has an associated set of pins 51, 53, 55 so that different widths of film 2 may be accommodated. Not only are different widths handled in this manner, but different type hole configurations 3 may also be used.

To rotate the bar 50 to a different side, hand pressure is exerted downward on bar 50 compressing springs 60, permitting bar 50 to be rotated about its shaft 62 until the desired side is exposed. Since the top surface 64 is preferably made of a phenolic non-conducting material, insulating strip 66 is positioned along the length of the bar 50 to prevent any shorting problems. In a similar manner, an insulating strip 67, 68, 69 is positioned on each of the different sides 52, 54, 56.

Strip magnets 63a and 63b are positioned in the insulating top surface 64. The magnets 63a, b respectively cooperate with spring leaf members 65a and 65b (only shown in FIG. 4 for drawing simplification) to hold down the film 2 adjacent the area of sealing. The leaf members by means of the force exerted on them by the strip magnets prevent unnecessary movement of the film. Although preferred, the strip magnets and leaf members are not required for an effective seal.

Wire 70 is wound on a rotatably mounted reel 72. The wire is fed through a porcelain eyelet 74 in top plate 76. A wire tension roller 78 is also positioned in plate 76 and wire 70 is fed under the roller 78 and between cutting blades 80, 81. Downward pressure on surface 82 causes cutting blade 81 to pivot about axis 83 toward cutting blade 80 to sever the wire as hereinafter described.

When the wire 70 is pulled so that it lays between cutting blades 80, 81, it is placed in spring conductors 90, 92. Each spring conductor 90, 92 has two slots so that in the event a double wire bond is required to ensure greater strength of bond, the wire may be looped around the center post 91, 93 and laid into the other slot of spring conductors 90, 92.

With the wire 70 retained in the spring conductors, the other end of the plastic film 2 is looped around the housing 16 and holes 3y, 3z engage pins 46, 48 to sandwich wire 70 between overlapping interfaces of film 2 to form a tube as illustrated in FIG. 1B.

The arm 18 includes a knob 100, a pressure bar 102 which is mounted by a pin slot means 103, 104, and under pressure by spring means 106, 107, 108. A catch 110 is positioned adjacent the knob to engage solenoid latch 112 of solenoid 113. The under surface 101 of arm 18 contacts surface 82 of the cutting means when the arm is moved downward.

Referring to FIGS. 7a and 7b, two methods of effecting a seal with the apparatus are shown in outline pictorial form. FIG. 7a is the conventional method in which the film 2 is looped about the housing body 16 and the wire 70 is positioned between the overlapping interfaces of the film. The pressure bar 102 then exerts pressure on the sandwiched heated wire element for a predetermined time. In FIG. 7b, the film 2 is not looped about the housing, but is positioned in ribbon fashion about the top of the housing. In this method, the pressure bar 102 exerts pressure through a double thickness of film and thereby affects the sealing after the predetermined period of time.

Referring now to FIGS. 7c and 7d, two additional methods of bonding the interfacing pieces are shown. In FIG. 7c, the wires 70, 70a are held in the retaining means (not shown) along the same line and the pieces to be bonded are positioned between the wire elements, one wire element beneath the lowest film surface and one wire element on top of the uppermost film surface. FIG. 7d is similar except that the wire elements are shifted with respect to one another, i.e., they are not positioned along the same line of the interface. In these arrangements, the bonding of the interfacing plastic pieces is achieved by heating the wire along the outer surfaces to sufficiently melt the plastic along the interfacing surfaces to effect the bond between them. It is, of course, understood that the results of the method of FIGS. 7c, d will be determined, inter alia, by material, material thickness and other factors such as time of voltage application.

The apparatus is connected to a 60 Hertz power source through a connector means 120. The power switch 122 is turned on and a Neon power light indicating means 124 indicates power to the apparatus through a fuze element 123.

The pressure arm 18 is moved downward over the film/wire interface and the pressure bar 102 exerts pressure and at the same time, knob portion 100a closes microswitch 126 and catch 110 engages solenoid latch 112 of solenoid 113. This also starts the seal timer means 127 for the heating cycle of wire element 70 which is indicated by another Neon power light means 128 and coupled to a step-down transformer 130. At the same time, solenoid timer 132 starts the pressure retention cycle which is longer than the heating cycle.

After a first predetermined time has elapsed, seal timer means 127 opens transformer circuit 130. After a second predetermined time, solenoid timer means 132 energizes solenoid 113 which moves solenoid latch 112, thereby allowing pressure arm 18 to be released and microswitch 126 to open. Light indicating means 128 goes out with the heating cycle which is controlled by the seal timer means 127. The time response of timers 127, 132 may be adjusted for different plastic films or wire elements by means of the respective variable potentiometers 129, 133.

The thus formed plastic tube as shown in FIG. 1B may then be removed from about the housing 16 and the excess wire trimmed close to the plastic film edges, completing the operation. In a preferred embodiment of the invention, the following components and film/wire combination were used:

| Reference No. | Description |
| --- | --- |
| 2 | MYLAR FILM, .005 Mil Thick. |
| 70 | WIRE, MONEL, .005 Mil Diameter, 11Ω/ft. |
| 113 | SOLENOID, PULL TYPE, 115 V, 10.3W, 0.26 Amp, Part #TS-1422, Dormeyer-Granger Co. |
| 122 | POWER SWITCH, 3 Amp. 125 V. |
| 123 | FUSE, 2 Amp. |
| 124, 128 | NEON, RED, 125 VAC, Part #B-1050Cl. Arrow Electronics, Totowa, N.J. |
| 126 | MICROSWITCH, 10 Amp, 125 V. |
| 127 | TIMER, SOLID STATE, Part #TS-2422, SSAC Precision Products Inc., Liverpool, N.Y. |

-continued

| Reference No. | Description |
|---|---|
| 129,133 | POTENTIOMETER, 1MΩ, Part #EF7695, Central Labs., Bloomfield, N.J. |
| 130 | TRANSFORMER, 117/25.2, 1 Amp, Part P-6469 Essex Stancor, Chicago, Ill. |
| 132 | TIMER, SOLID STATE, Part TS-1422, SSAC Precision Products Inc., Liverpool, N.Y. |

With the indicated components, the seal timer 127 has about a 13 to 18 sec. setting range, and the solenoid timer has about an 18 to 23 sec. timing range. In the preferred embodiment using the (0.005) Mylar film, the seal timer is set to about 13 sec. and the solenoid timer is set to about 18 seconds.

While I have described above the principles of my invention in connection with specific apparatus, it is to be clearly understood that this description is made only by way of example and not as a limitation to the scope of my invention as set forth in the objects thereof and in the accompanying claims.

I claim:

1. A method of forming a tubular pattern control card using a sealing apparatus having a tubular housing containing a reel of wire and a pressure member mounted to selectively exert pressure along one surface of said housing, the method comprising:

preparing a length of flexible plastic film with a predetermined array of punched holes;

fixing one end of said length of film on the one surface of the sealing apparatus;

withdrawing a length of wire from said reel and positioning and retaining it along said fixed one end of film in conducting means on said surface;

looping and fixing the other end of said film to sandwich the retained wire between the overlapping interfaces of the film ends;

pressing the overlapping interfaces together with said pressure member and at the same time applying a voltage to the retained wire and severing the length of wire from said reel;

maintaining the pressure on the overlapping interfaces and wire for a period of time longer than the period of voltage application, whereby the interfacing surfaces of the film adhere along the length of wire; and releasing the pressure member and removing the formed tubular pattern control card from the sealing apparatus.

2. The method of claim 1 including
retaining another length of wire between the overlapping interfaces, and applying the voltage simultaneously to said length and said another length of retained wire.

3. The method of claim 1 wherein the loop of said film is formed about the tubular housing.

4. The method of claim 1 wherein the loop of said film is formed in a ribbon fashion on said one surface, and the formed loop and overlapping interfaces are pressed together by the pressure member.

5. The method of claim 1 wherein said wire is a thermoplastic covered wire.

6. The method of claim 1 including the step of trimming any excess wire from the edges of the flexible plastic tubular pattern control card.

7. A method of forming a tubular pattern control card using a sealing apparatus having a tubular housing containing a reel of wire and a pressure member mounted to selectively exert pressure along one surface of said housing, the method comprising:

preparing a length of flexible plastic film with a predetermined array of punched holes;

withdrawing wire from said reel and positioning and retaining a first length along said one surface in conducting means mounted thereon;

fixing one end of said length of film on the one surface of the sealing apparatus over said first length of wire;

looping and fixing the other end of said film onto said one end to form overlapping interfaces at the film ends;

positioning and retaining a second length of wire in the conducting means along the overlapped surfaces;

pressing with the pressure member the wires and the overlapping interfaces together and simultaneously applying a voltage to the retained wires;

maintaining the pressure on the overlapping interfaces and wires for a period of time longer than the period of voltage application, whereby the interfacing surfaces of the film adhere along the length of wires; and releasing the pressure member and removing the formed plastic tubular pattern control card and wires from the sealing apparatus.

8. The method of claim 7 wherein the first and second wires are positioned along the same line one above the other.

9. The method of claim 7 wherein the first and second wires are shifted with respect to one another.

10. The method of claim 1 wherein the loop of said film is formed about the tubular housing.

* * * * *